Feb. 9, 1971 A. B. BECK ET AL 3,561,111
METHOD FOR MAKING PRECISION, SQUARE-WIRE, AIR CORE COILS
Filed Aug. 7, 1968

Alfred B. Beck
Kenneth L. Schirmer
INVENTORS

BY *Frank Wattles*

ATTORNEY

United States Patent Office 3,561,111
Patented Feb. 9, 1971

3,561,111
METHOD FOR MAKING PRECISION, SQUARE-WIRE AIR CORE COILS
Alfred B. Beck, Torrance, and Kenneth L. Schirmer, Gardena, Calif., assignors to TRW Inc., Redondo Beach, Calif., a corporation of Ohio
Filed Aug. 7, 1968, Ser. No. 750,956
Int. Cl. H01f 7/06
U.S. Cl. 29—602                              7 Claims

ABSTRACT OF THE DISCLOSURE

A method of making precision, square-wire air core coils by combining an electroforming technique with a precision machining technique. The manufacture includes the steps of copper plating an aluminum mandrel having a polished outside diameter the size of the desired inside diameter of the coil, machining the copper plating to the desired outside coil diameter, and cutting a helical groove through the copper plating to form a coil. The coil ends are then trimmed to the desired length and mounting apertures are formed at the ends of the coil. Finally, the mandrel is separated from the coil by dissolving the mandrel in a solution of lye. Additional optional steps include depositing a coating of silver on the coil, installing square cross-section Teflon combs inside the coil to prevent deformation, and enclosing the coil inside a cylindrical sleeve of heat shrinkable tubing to provide longitudinal rigidity.

BACKGROUND OF THE INVENTION

(1) Field of the invention

A method of making air core coils, and more specifically a method of making precision, square-wire air core coils by copper plating a polished aluminum mandrel having an outside diameter equal to the desired inside diameter of the coil, machining the copper plating to the desired coil diameter, cutting helical grooves through the copper to form the coil, and dissolving the mandrel in a solution of lye.

(2) Description of the prior art

Conventional square-wire air core coils are often produced by cutting spirally through a tube of copper or other suitable conducting material. Square wire coils which are not air core have been produced by plating a cylinder of nonconductive material with an electrodeposit of copper and then cutting a spiral groove through the coating to the nonconductive material so that a conductive coil mounted on an insulating base results. Square-wire coils have also been produced by cutting a tube of nonconductive material spirally and applying a conductive material between the spiral turns.

Three patents illustrating the conventional art are:

1,767,715—Electrical Resistance
1,820,240—Coil
3,000,079—Tuner and Method for Making Same Although each of these methods produces an inductance coil, none of the methods utilize the combined techniques of electroforming and precision machining to precisely control the physical dimensions of the air core coil produced. In the invention presented herein an aluminum mandrel is fabricated to have a polished outside diameter equal to the desired inside diameter of the coil. Electromechanical means are used to plate the mandrel with copper; and precision machining is used to obtain the desired outside diameter of the copper, to cut a helical groove through the copper plating to the mandrel, and to trim the ends of the coil formed. The aluminum mandrel is then dissolved in a solution of lye leaving a precision air core coil.

To bypass the need for precision dimension, conventional coils have included tuning cores of metallic or magnetic material in conjunction with variable capacitors. In broad bandwidth applications, these tuning cores have degraded the Q-factor of the coil (i.e., the measure of efficiency as evidenced by the ratio of reactance to resistance), and introduced undesirable stray capacitance.

Since the industance of an air core coil of nonmagnetic metal is strictly a function of physical dimensions and the geometry of the surrounding conductive enclosure, the problem of maintaining high inductance accuracy is resolvable by precision control of the physical dimensions of the coil. The electroforming process presented in this invention is capable of realizing the prerequisite tolerances for such precision. Experiments with the method have derived typical inductance accuracies of +0.25 percent whereas inductance accuracy better than 3 to 5 percent was difficult, impractical, and costly to derive by conventional techniques.

SUMMARY OF THE INVENTION

Briefly, this invention provides a method for making air core coils which comprises plating the outside diameter of a mandrel with a conductive metal, machining the plating to the desired outside diameter, and cutting a helical groove through the plating to form a coil. Finally, the mandrel is removed and a comb is installed on the finished coil to prevent deformation.

DESCRIPTION OF THE PREFERRED EMBODIMENTS

Figure 1:
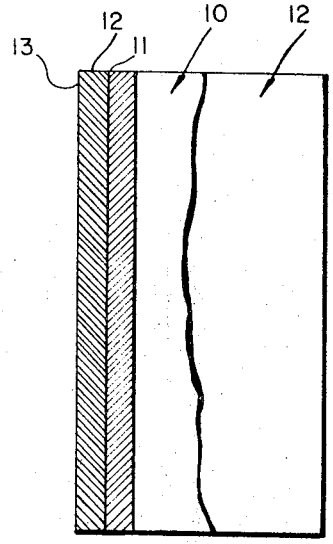
FIG. 1 is a cross-section of a mandrel plated with copper.

In FIG. 1 a hollow mandrel 10 is fabricated having an outside diameter 11 the desired size of the inside diameter of an air core coil. The preferred material for mandrel 10 is aluminum or a low melting point metal alloy, however any material may be used which may be machined or formed to precision dimensions and removed from the formed coil. The outside diameter 11 of mandrel 10 is polished and plated with copper 12 or other like nonmagnetic metal by electromechanical means. The outside diameter 13 of copper plating 12 slightly exceeds the desired outside diameter of the air core coil to allow copper plating 12 to be precision machined to the desired dimension. By precisely controlling the dimensions of the outside diameter 11 of mandrel 10, high inductance accuracy is possible since accuracy is dependent upon the physical dimensions of a coil.

In mass production the mandrel can be of a length to accommodate a plurality of coil blanks instead of only one. After the mandrel is plated and the helical groove cut, then the coil formed on the mandrel may be cut in sections of appropriate length to form coil blanks.

Figures 2, 3:
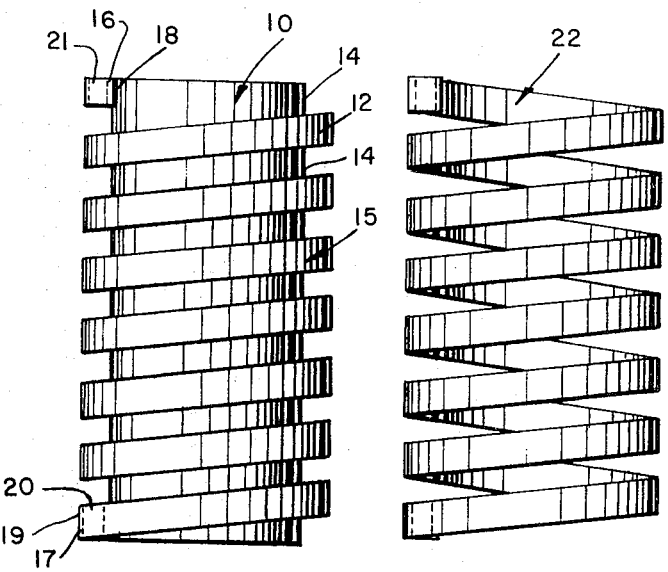
FIG. 2 is a front view of the plated mandrel with helical grooves.
FIG. 3 illustrates a square-wire air core coil produced by the method described in this invention.

In FIG. 2 a helical groove 14 is cut through copper plating 12 to mandrel 10 to form a coil 15. The first turn 16 and last turn 17 of coil 15 are trimmed at ends 18 and 19, and mounting apertures 20 and 21 are formed proximal to ends 18 and 19. Mounting components can be placed in the aperatures 20, 21 and secured. The mandrel 10 is then dissolved such as dissolving aluminum in a lye soltuion, or a low melting point alloy is melted out. The aluminum mandrel can be etched to facilitate removal. The coil may be silver plated to produce a finished coil.

FIG. 3 shows the precision square-wire air core coil 22 remaining after the mandrel 10 has been dissolved.

Figure 4:
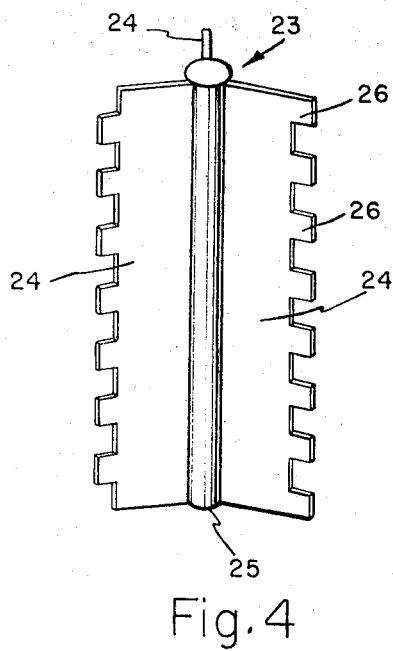
FIG. 4 illustrates one form of comb adapted to be installed inside a square-wire air core coil.

FIG. 4 illustrates one form of comb 23 comprising a plurality of sections 24 extending radially outward from a support post 25. The outside ends of sections 24 have teeth 26 formed thereon to receive therebetween the turns of coil 22. Comb 23 may be of any appropriate material to support the coil turns and prevent longitudinal coil deformation with Teflon the preferred material. Change in coil length or length between coil turns is undesirable because the coil inductance is changed.

Figure 5:
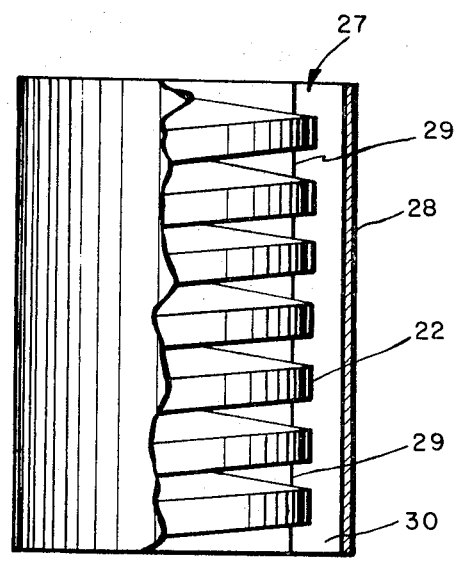
FIG. 5 illustrates a section view showing the preferred form of comb installed inside a square-wire air core coil.

FIG. 5 illustrates a preferred form of comb 27 secured within heat shrinkable tube 28 upon coil 22. The comb 27 serves the same purpose as the comb 23 illustrated in FIG. 4 and may be made of the same material. However, the comb teeth 29 are not supported upon a center support post. The teeth 29 are formed on a strip 30 which may be inserted between the coil turns from the outside of coil 22. The turns are supported between the teeth 29 to prevent longitudinal coil deformation. Comb 27 may comprise a plurality of strips 30, the number of strips being dependent on support requirements. The coil 22 supported by comb 23 may be enclosed within a heat shrinkable tube 28 so the contraction of tube 28 will lock the coil turns in place upon the comb. It is understood that comb 27 may be enclosed also within a heat shrinkable tube to lock the coil turns in place upon comb 27.

While certain embodiments of the invention have been described in detail herein and shown in the accompanying drawing, it will be evident that various additional modifications are possible in the arrangement and construction of its components without departing from the scope of the invention.

We claim.

1. A method of making air core coils, which comprises:
    fabricating a hollow aluminum mandrel having an outside diameter equal to the desired inside diameter of the coil,
    polishing the outside diameter of the mandrel,
    plating the outside of the mandrel with copper by electromechanical means to a depth sligthly greater than the desired outside diameter of the coil,
    machining the copper plating to the desired diameter in a lathe,
    cutting a helical groove through the copper plating to form a coil,
    cutting the copper coil into discrete coil blanks,
    trimming the first and last turns of each coil blank,
    forming apertures for mounting components at the ends of each coil,
    dissolving the aluminum mandrels in a lye solution,
    depositing a coating of silver on each copper coil,
    installing a comb upon each coil to prevent longitudinal coil deformation, and
    enclosing each coil in a cylindrical sleeve of heat shrinkable tubing.

2. A method of making air core coils, which comprises:
    fabricating a hollow aluminum mandrel having an outside diameter equal to the desired inside diameter of the coil,
    polishing the outside diameter of the mandrel,
    plating the outside of the mandrel with copper by electromechanical means to a depth slightly greater than the desired outside diameter of the coil,
    machining the copper plating to the desired diameter in a lathe,
    cutting a helical groove through the copper plating to form a coil,
    trimming the first and last turns of each coil blank,
    forming apertures for mounting components at the ends of each coil,
    removing the mandrel,
    depositing a coating of silver on the coil,
    installing a comb upon the coil to prevent longitudinal coil deformation, and
    enclosing the coil in a cylindrical sleeve of heat shrinkable tubing.

3. A method as recited in claim 2 wherein the comb is installed adjacent to the inside diameter of the finished coil.

4. A method as recited in claim 2 wherein the comb is installed adjacent to the outside diameter of the finished coil.

5. A method as recited in claim 2 wherein the step of removing the mandrel is accomplished by dissolving the mandrel.

6. A method as recited in claim 5 wherein the removing of the mandrel is accomplished by dissolving in a solution of lye.

7. A method as recited in claim 2 wherein the step of removing the mandrel is accomplished by etching.

References Cited

UNITED STATES PATENTS

| | | | |
|---|---|---|---|
| 1,739,246 | 12/1929 | Majce | 336—207X |
| 1,820,240 | 8/1931 | Michell. | |
| 1,994,767 | 3/1935 | Heintz | 29—602 |
| 2,406,961 | 9/1946 | Nichol | 336—207X |
| 2,589,521 | 3/1952 | Wheeler et al. | 29—618X |
| 2,879,436 | 3/1959 | Geisler. | |
| 2,938,210 | 5/1960 | Harris | 29—605X |
| 3,123,787 | 3/1964 | Shifrin | 336—229 |
| 3,234,630 | 2/1966 | Kengon | 29—423X |
| 3,247,579 | 4/1966 | Cattermole et al. | 29—423X |
| 3,273,226 | 9/1966 | Brous et al. | 29—423X |

JOHN F. CAMPBELL, Primary Examiner

C. E. HALL, Assistant Examiner

U.S. Cl. X.R.

29—423, 527.2, 527.4; 336—207, 209